United States Patent
Min et al.

(10) Patent No.: US 8,573,249 B2
(45) Date of Patent: Nov. 5, 2013

(54) RELIEF VALVE FOR OIL PUMP

(75) Inventors: Doogie Min, Suwon-si (KR); Seokjun Yoon, Anyang-si (KR); Jongho Kim, Hwaseong-si (KP)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 244 days.

(21) Appl. No.: 13/177,784

(22) Filed: Jul. 7, 2011

(65) Prior Publication Data

US 2012/0103442 A1 May 3, 2012

(30) Foreign Application Priority Data

Oct. 28, 2010 (KR) .................. 10-2010-0105719

(51) Int. Cl.
*F16K 17/04* (2006.01)
(52) U.S. Cl.
USPC .............. 137/526; 137/538; 137/625.25
(58) Field of Classification Search
USPC ........... 137/526, 538, 565.35, 625.25, 625.67
See application file for complete search history.

(56) References Cited

U.S. PATENT DOCUMENTS

| 2,184,190 | A | * | 12/1939 | Krauss ................ 188/322.21 |
| 4,276,960 | A | * | 7/1981 | Webb et al. ............. 184/6.22 |
| 2004/0226613 | A1 | | 11/2004 | Ono | |
| 2007/0034262 | A1 | | 2/2007 | Cozens et al. | |

FOREIGN PATENT DOCUMENTS

| JP | 2-125182 A | 5/1990 |
| JP | 5-195743 A | 8/1993 |
| JP | 2004-232670 A | 8/2004 |
| JP | 2005-69352 A | 3/2005 |
| KR | 10-0281823 B1 | 2/2001 |
| KR | 10-2005-0017073 A | 2/2005 |

\* cited by examiner

*Primary Examiner* — Kevin Lee
*Assistant Examiner* — Macade Brown
(74) *Attorney, Agent, or Firm* — Morgan, Lewis & Bockius LLP

(57) ABSTRACT

A relief valve for an oil pump, may include a housing defining a relief space, a plunger slidably disposed in the relief space and dividing the relief space into a housing chamber and a plunger chamber, an elastic member elastically supporting the plunger and being compressed by oil pressure of the main gallery, wherein the oil pressure of the main gallery may be relatively lower than an oil pressure under a warm-up state of the engine, a locator disposed under the plunger and supporting the elastic member, a plug coupled to a lower portion of the housing under the relief space and supporting the locator such that a modulus of elasticity in the elastic member may be changed by a change in seat position of the elastic member, and a negative pressure supplier selectively generating negative vacuum pressure in the locator such that a height of the locator changes.

12 Claims, 8 Drawing Sheets

RELIEF VALVE FOR OIL PUMP

CROSS-REFERENCE TO RELATED APPLICATIONS

The present application claims priority to Korean Patent Application Number 10-2010-0105719 filed Oct. 28, 2010, the entire contents of which application is incorporated herein for all purposes by this reference.

BACKGROUND OF THE INVENTION

1. Field of the Invention

The present invention relates to a relief valve for an oil pump, and more particularly, to a relief valve for an oil pump that can control oil pressure at the optimum level such that the main gallery is not damaged, and considerably decrease peak pressure in cold start.

2. Description of Related Art

In general, oil pumps are devices that suck oil stored in an oil pan and supply the oil to parts to lubricate.

The oil pumped up to an oil pump increases in pressure inside the oil pump and the oil that is discharged under high pressure from the oil pump may impact or damage an oil filter or a lubrication circuit.

Therefore, a relief valve that keeps the pumped oil at appropriated pressure is disposed at the oil outlet of the oil pump.

The relief valve keeps the oil-discharging pressure of the oil pump at an appropriate level and particularly prevents the main gallery from being damaged by high oil-discharging pressure by making bypass flow that returns some of the oil discharged from the oil pump to the oil pump or the oil pan, when the discharging pressure of the oil discharged from the oil pump to the main gallery of the engine increases above appropriate pressure.

FIG. 7 shows the configuration of a relief valve of the related art, in which a relief valve 200 of the related art includes: a plunger 201 that is disposed at a return hole 102 that is formed in a housing 100, perpendicular to the path of a discharging hole 101 through which oil is discharged to the main gallery of an engine, and bypasses some of discharged oil; a spring 202 that elastically supports plunger 201 in a spring chamber 203 having an air vent hole 204 exposed to the atmosphere at a predetermined distance from return hole 102; and a plug 203 that is thread-fastened to spring chamber 203 and support spring 202.

Therefore, plunger 201 directly carries the discharging pressure of the oil that is pumped by the oil pump and discharged outside through discharging hole 101, and when the discharging pressure of the oil largely increases, plunger 101 is pushed, thereby opening return hole 102.

As return hole 102 is opened by plunger 101, some of the oil discharged out through discharging hole 101 is bypassed to return hole 102, such that it can return to the oil pump or the oil pan.

The discharging pressure of the oil supplied to the main gallery of the engine, through discharging hole 101, can be kept at appropriate pressure by the return of the oil according to bypass due to return hole 102.

Control of discharging pressure of the oil can prevent the oil filter and the oil cooler from being damaged even in the cold start of the engine in which the oil pressure of the oil pump becomes relatively high, and particularly, it is possible to prevent the oil pressure at the main gallery of the engine from excessively increasing even if the number of revolution of the oil pump increases.

Relief valve 200 has the advantage of being able to quickly control the discharging pressure of the oil discharged outside through discharging hole 101.

However, it is required to ensure a sufficient relief margin to achieve quick response of relief valve 200, and accordingly, it is possible to maintain the oil pressure at the main gallery of the engine at an appropriate level, that is, to keep lubrication stable.

The capacity of the oil pump should be increased to keep the lubrication stable and the increase in capacity of the oil pump necessarily increase loss of fuel efficiency because the driving torque increases.

On the other hand, referring to FIG. 8 showing the property of oil that the viscosity increases at low temperature, it is difficult to keep appropriate oil pressure at the main gallery with relief valve 200 at relatively low oil temperature, such as in cold start or warm-up.

Further, relief valve 200 necessarily has a limit that it cannot appropriately control drop of oil pressure due to clogging of the oil filter for long-time use.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a relief valve for an oil pump that can prevent damage to a main gallery by greatly decrease peak pressure, using quick bypass flow according to oil pressure at the main gallery in cold start in which oil-discharging pressure is relatively higher at an oil pump than the main gallery, and can implement optimum discharging pressure control of the oil in warm up or even after warm up, by controlling discharging pressure of the oil pump, by making a bypass path due to direct influence of the oil pressure on the main gallery of the engine.

In an aspect of the present invention, the relief valve for an oil pump, may include a housing defining a relief space therein, a plunger that may be slidably disposed in the relief space of the housing and divides the relief space into a housing chamber fluid-communicating with a main gallery of an engine and a plunger chamber fluid-communicating with an outlet of the oil pump discharging oil to the main gallery and selectively bypassing a portion of oil discharged from the main gallery, an elastic member that elastically supports the plunger and may be compressed by oil pressure of the main gallery supplied in the plunger chamber, wherein the oil pressure of the main gallery may be relatively lower than an oil pressure under a warm-up state of the engine, a locator that may be disposed under the plunger in the housing and supports the elastic member, a plug that may be coupled to a lower portion of the housing under the relief space and supports the locator such that a modulus of elasticity in the elastic member may be changed by a change in seat position of the elastic member, and a negative pressure supplier that may be fluid-connected to the plug and selectively generates negative vacuum pressure in the locator such that a height of the locator changes.

A plunger body of the plunger defines the housing chamber above the plunger body inserted in the relief space and defines the plunger chamber using at least one or more oil channels formed through the plunger body.

The oil channels may be symmetrically formed along a circumferential direction of the plunger body.

The elastic member may be partially inserted in a spring groove formed in the plunger.

The spring groove may be formed in a lower portion of the plunger body of the plunger which may be inserted in the relief space.

The elastic member may include a main spring elastically supporting the plunger, the locator disposed under the plunger in the housing, and a sub-spring disposed between the locator and the plug and elastically supporting the locator toward the main spring.

The main spring and the sub-spring may have different modulus of elasticity.

The locator may include a stopper that may be disposed under the plunger body and accommodates the sub-spring of the elastic member therein, wherein the stopper defines a negative vacuum pressure space therein such that the negative pressure supplier selectively generates the negative vacuum pressure under the stopper, and a tube engaged with the stopper and supporting the main spring of the elastic member, wherein the tube may be compressed or extended by movement of the stopper such the height of the stopper changes.

The tube encloses the stopper and receives the sub-spring therein.

A change in the height of the stopper may be limited by a stopper cylinder coaxially expanding at a lower portion of the relief space.

The housing may include the stopper cylinder to receive the locator and the sub-spring therein, a diameter of the stopper cylinder being larger that a diameter of the relief space so as to restrict movement of the locator within the stopper cylinder.

The tube may be made of extendable rubber in a bellows shape.

The negative pressure supplier may include a switch that may be selectively turned on/off, a vacuum tank that generates the negative vacuum pressure in the locator through an axial hole formed through the plug, and a valve that makes the negative vacuum pressure of the vacuum tank transmitted in one direction.

According to the exemplary embodiments of the present invention, since the discharging pressure of the oil pump is directly controlled by the oil pressure at the main gallery of an engine, it is possible to control the discharging pressure at a stable level even under a relative pressure difference between the oil pump and the main gallery.

In particular, according to the exemplary embodiments of the present invention, it is possible to prevent the main gallery from being damaged by largely decreasing peak pressure, by using quick bypass flow according to the oil pressure at the main gallery in cold start in which the discharging pressure of the oil pump is relatively higher than that of the main gallery, and to implement optimum discharging-pressure control of the oil in warm-up or even after warm-up.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
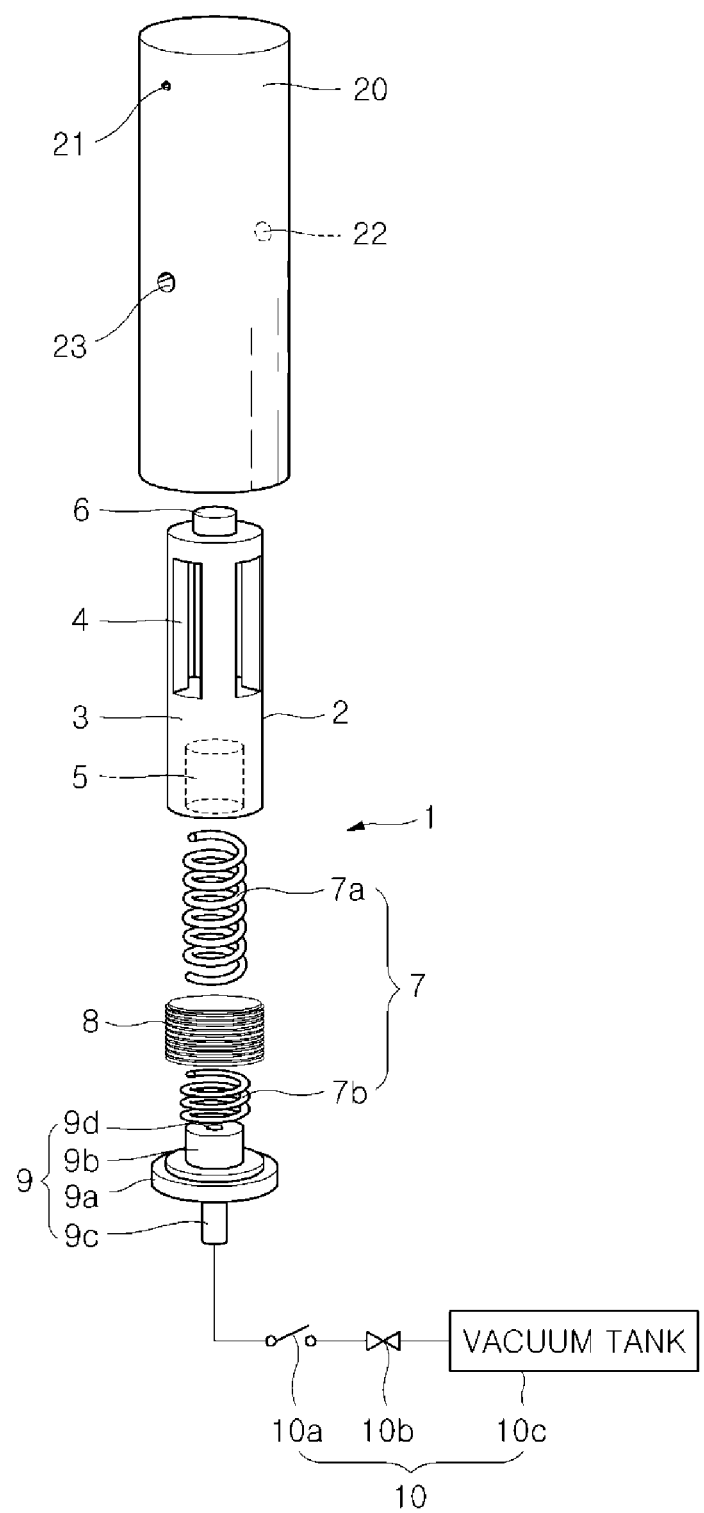
FIG. 1 is a view showing the configuration of a relief valve for an oil pump according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention are described hereafter in detail with reference to the accompanying drawings, and the exemplary embodiments can be achieved in various ways by those skilled in the art and the present invention is not limited to the exemplary embodiments.

FIG. 1 shows the configuration of a relief valve for an oil pump according to the exemplary embodiment of the present invention. A relief valve 1 according to the exemplary embodiment of the present invention includes: a plunger 2 that is operated by oil pressure from a main gallery of an engine and decreases discharging pressure of an oil pump, an elastic member 7 that elastically supports plunger 2, a locator 8 that changes a modulus of elasticity by adjusting the height of the seat position of elastic member 7 by turning on/off a switch 10a, a plug 9 that holds locator 8, and a negative pressure supplier 10 that generates negative vacuum pressure in locator 8 through plug 9.

Plunger 2 has a cylindrical plunger body 3, an oil channel 4 formed through plunger body 3, a spring groove 5 formed in the lower portion of plunger body 3, and a spacer boss 6 protruding from the top of plunger body 3.

At least one or more oil channels 4 are formed and four oil channels may be formed symmetrically at 90° intervals.

Elastic member 7 includes a main spring 7a elastically supporting plunger 2 and locator 8 and a sub-spring 7b that elastically supports locator 8 and plug 9.

Main spring 7a and sub-spring 7b have different modulus of elasticity and the modulus of elasticity of main spring 7a should be set such that plunger 2 can be moved down even under smaller oil pressure Pa than normal oil pressure Pb of the main gallery of the engine.

The normal oil pressure Pb is oil pressure that is produced in the main gallery when the engine is fully warmed up and the smaller oil pressure Pa is oil pressure that is produced in the main gallery before the engine is fully warmed up and in cold start.

The smaller oil pressure Pa has a pressure value lower than the discharging pressure of the oil pump.

Locator 8 includes a stopper 8a defining a vacuum negative pressure space and a tube 8b that is compressed or extended by movement of stopper 8a such that the height of stopper 8a changes.

Tube 8b is made of extendable rubber in a bellows shape.

Plug 9 has a cylindrical plug body 9a with a seating boss 9b protruding from one side and a connecting portion 9c protruding from the opposite side and a stepped surface is formed coaxially with seating boss 9b on the surface where seating boss 9b is formed in plug body 9a.

An axial hole 9d is formed through the center of plug 9.

Negative pressure supplier 10 includes a switch 10a that is turned on/off, a vacuum tank 10c that generates negative vacuum pressure, and a valve 10b that makes the negative vacuum pressure of vacuum tank 10c transmitted in only one direction.

The negative vacuum pressure of vacuum tank 10c is transmitted to plug 9 through a vacuum line.

Figure 2:
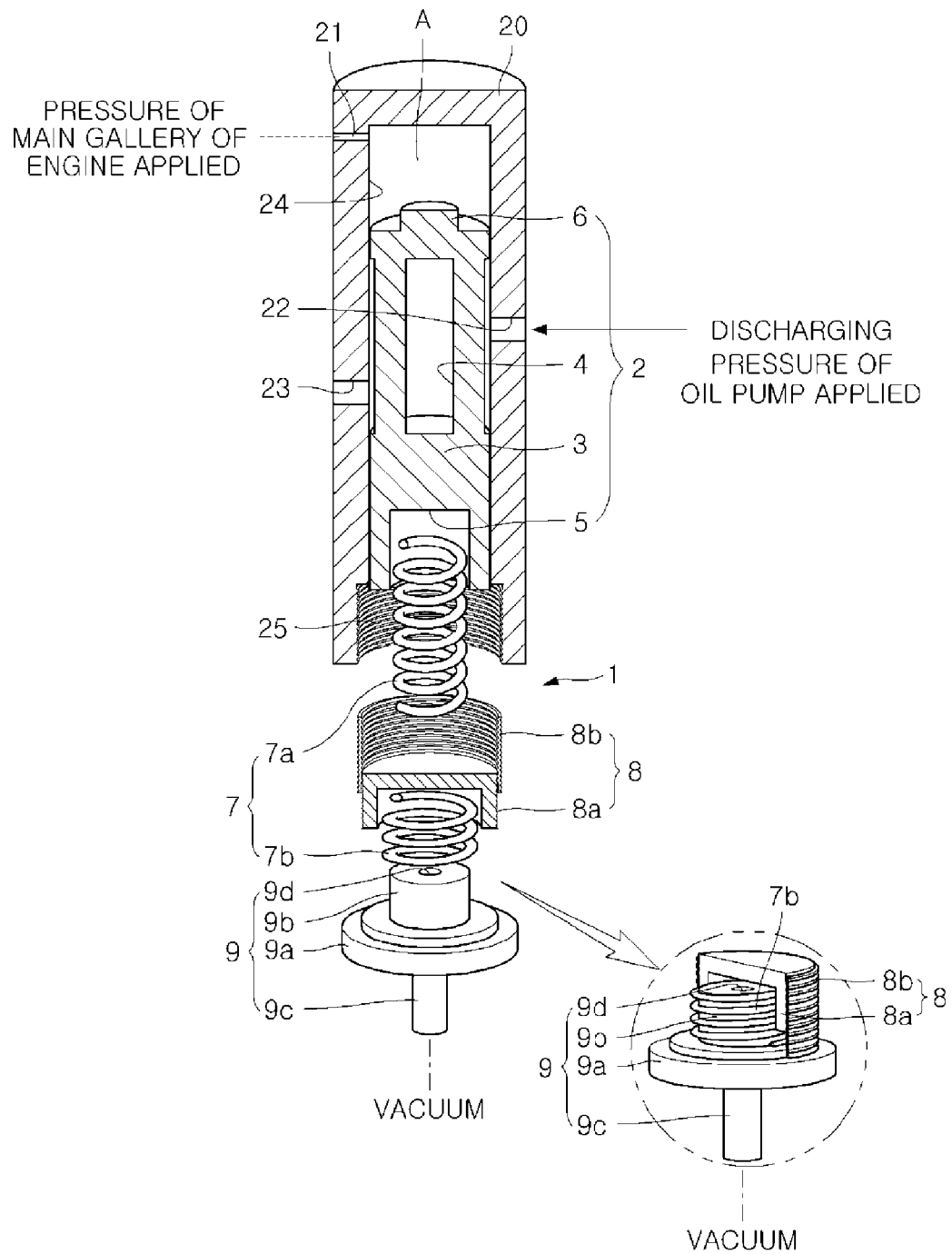
FIGS. 2 to 3 are cross-sectional views showing the configuration of the relief valve according to the exemplary embodiment of the present invention.

FIG. 2 shows the combination relationship of elastic member 7, locator 8, and plug 9, according to the exemplary embodiment of the present invention.

As shown in the figure, sub-spring 7b of elastic member 7 is coupled to seating boss 9b of plug 9, seating boss 9b of plug 9 is accommodated in stopper 8a of locator 8, tube 8b coupled to stopper 8a of locator 8 makes seal with plug 9, in close contact with the stepped surface constructing a coaxial circle outside seating boss 9b.

Locator 8 and plug 9 make seal, using tube 8b, such that stopper 8a can be smoothly moved by the negative vacuum pressure applied to locator 8.

Figure 3:
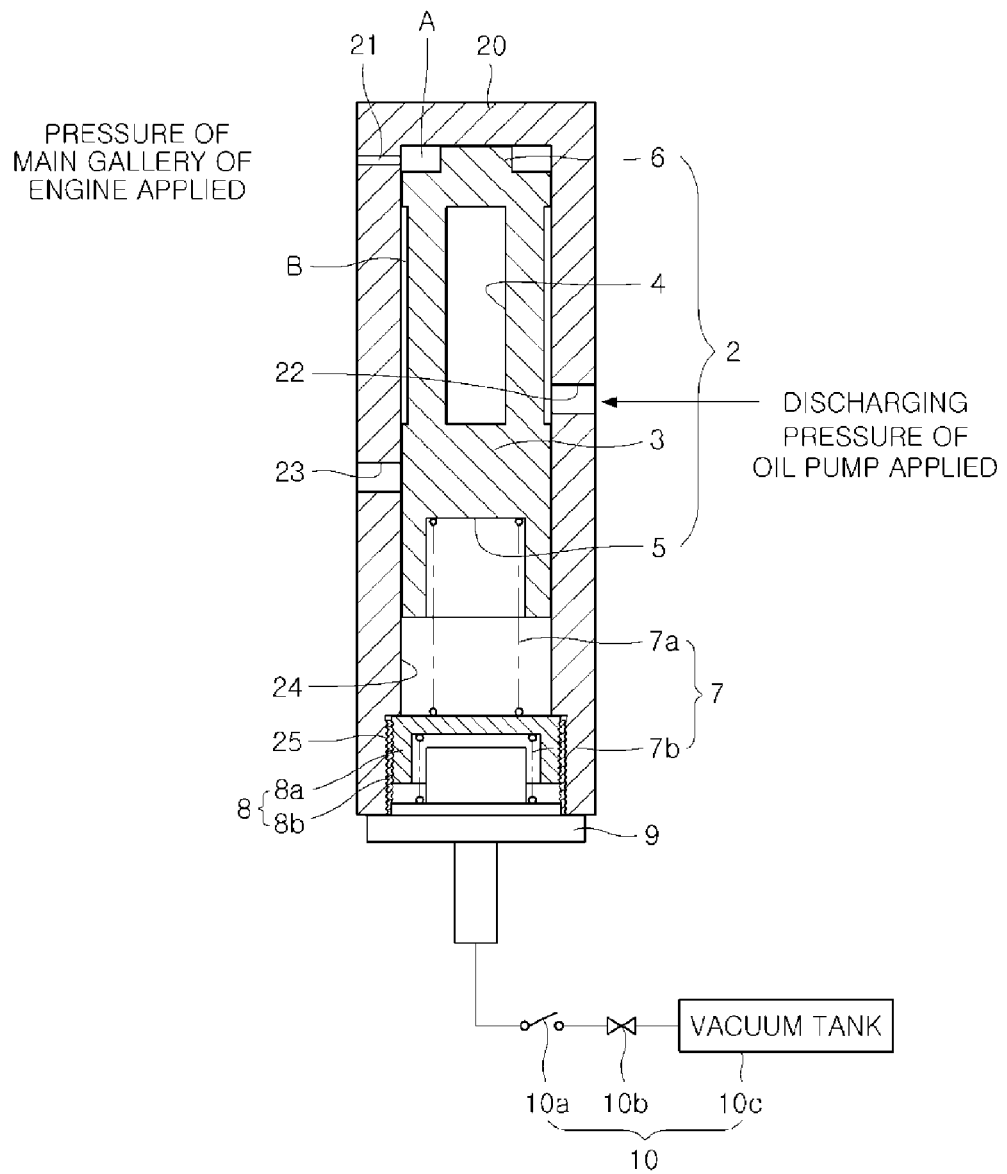

FIG. 3 is an assembly cross-sectional view showing the inside of an oil pump housing of the relief valve according to the exemplary embodiment of the present invention.

As shown in the figure, a relief space, which communicates with an outlet through which the pumped oil is discharged to the main gallery of the engine and bypasses some of the oil at high discharging pressure, is defined in housing 20 and relief valve 1 is disposed in the relief space.

The relief space includes an operational hole 21 that the oil pressure of the main gallery of the engine is applied to, a return hole 22 that the discharging pressure of the oil pump, which is supplied from the oil pump to the main gallery of the engine, is applied to, a bypass hole 23 that decreases the pressure at the outlet of the oil pump by bypassing the oil flowing in return hole 22 to the oil pump or the oil pan, and a space accommodating relief valve 1, in which operational hole 21, return hole 22, and bypass hole 23 are formed in a housing cylinder 24.

Return hole 22 is positioned between operational hole 21 and bypass hole 23, the vertical height between operational hole 21 and bypass hole 23 is larger than the vertical height of oil channels 4 of plunger 2, and the vertical length between operational hole 21 and return hole 22 is smaller than vertical height of oil channels 4 of plunger 2.

In the exemplary embodiment, when relief valve 1 is inserted in the relief space of housing cylinder 24, the relief space is divided into two chambers by the structure of plunger 2 of relief valve 1.

That is, a housing chamber A using the upper portion of plunger 2 is defined at the upper portion of the relief space and a plunger chamber B is defined in the other space, except for housing chamber A, in the relief space.

Operational hole 21 is positioned in housing chamber A while return hole 22 and bypass hole 23 that communicate with oil channels 4 of plunger body 3 are positioned in plunger chamber B.

Accordingly, the oil pressure at the main gallery of the engine, which is applied to plunger 2, is exerted in housing chamber A, while bypass flow allowing the oil at the outlet of the oil pump which is discharged to the main gallery to return to the oil pump or the oil pan is made in plunger chamber B, and elastic support force of elastic member 7 is applied to plunger 2 against the pressure in housing chamber A.

In the exemplary embodiment, a stopper cylinder 25 expanding coaxially with housing cylinder 24 is further formed at the lower portion of housing cylinder 24. Further, stopper cylinder 25 provides a space for accommodating locator 8 and functions as a stopper that limits the maximum movement distance of locator 8.

FIG. 3 shows when relief valve 1 disposed in the relief space of housing 2 does not operate, that is, oil pressure is not applied and there is no negative vacuum pressure in locator 8 by turning-off of switch 10.

Accordingly, only the elastic force of main spring 7a of elastic member 7 is applied to plunger 2 of relief valve 1 and the position of plunger 2 has been fixed by the elastic force of main spring 7a.

In this state, only the elastic force of sub-spring 7b of elastic member 7 is applied to locator 8.

With relief valve 1 in the position described above, housing chamber A communicates with the main gallery through operational hole 21 and plunger chamber B communicates with the outlet of the oil pump through return hole 22, while bypass hole 23 is blocked by plunger 2.

Figure 4:
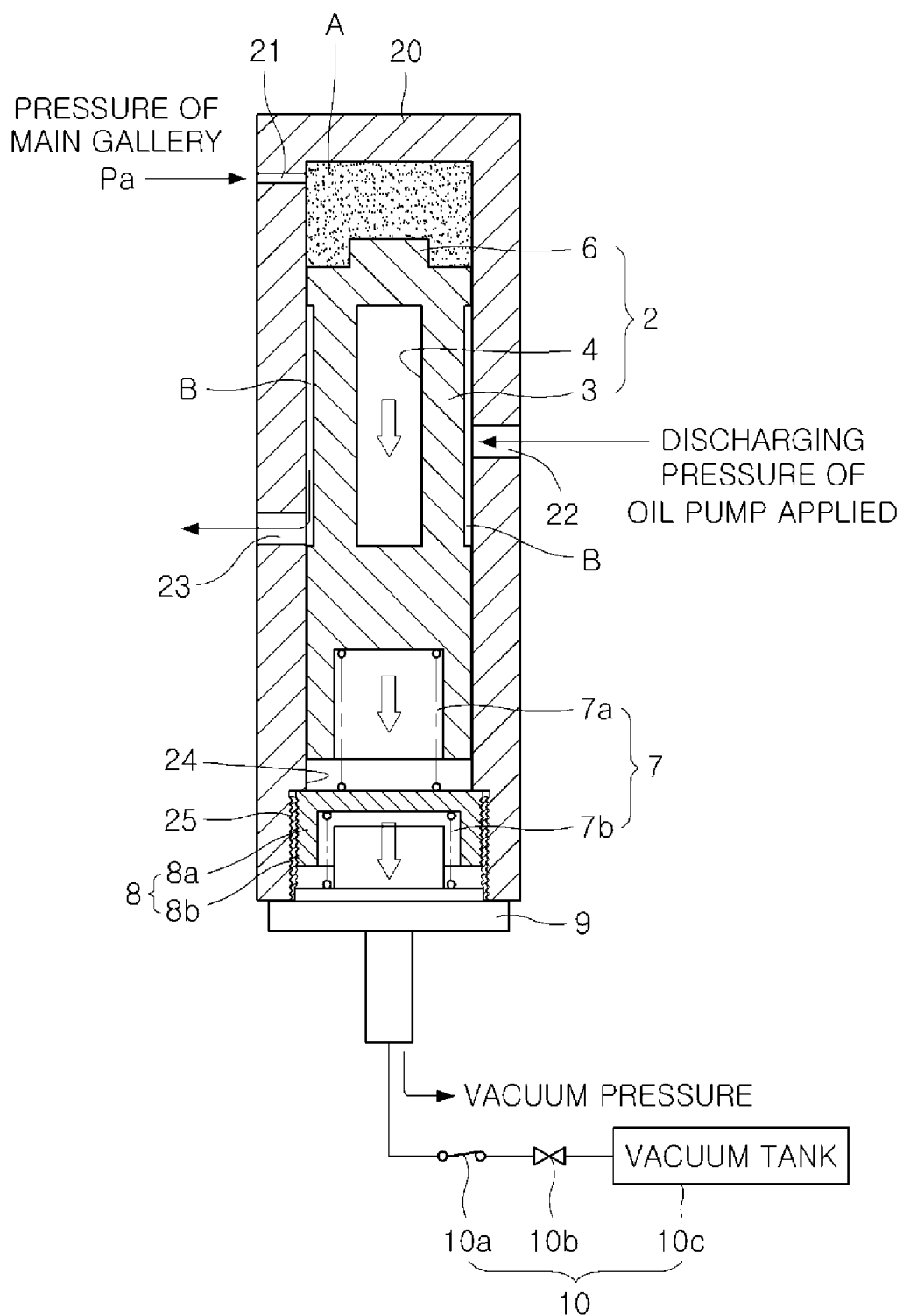
FIGS. 4 to 6 are views showing the operation of the relief valve according to the exemplary embodiment of the present invention.

FIG. 4 is a view showing the operation of the relief valve according to the exemplary embodiment of the present invention in cold start of the engine.

In the cold start, switch 10a is turned on and the negative vacuum pressure of vacuum tank 10c is applied to locator 8, such that tube 8b is compressed. Further, stopper 8a fixing tube 8b moves down to plug 9 and spaces locator 8 from stopper cylinder 25.

This is because sub-spring 7b of elastic member 7 accommodated inside stopper 8a is compressed by the movement of stopper 8a of locator 8.

That is, locator 8 that has moved down, as described above, changes the initial seat position of elastic member 7 by moving down main spring 7a on stopper 8a, such that locator 8 moves away from stopper cylinder 25 and the modulus of elasticity of elastic member 7 is changed by the seat position that became lower than the initial state.

The change in seat position of main spring 7a can make compression even under pressure lower than normal pressure Pb of the main gallery of the engine that has been fully warmed up.

The oil pressure of the main gallery gradually increases after the engine is cold-started, such that the pressure produced in housing chamber A is gradually increased by oil pressure Pa of the main gallery which is transmitted through operational hole 21, and applied to plunger 2, while only the elastic support force of main spring 7a that elastically supports plunger 2 is exerted in plunger chamber B.

Therefore, plunger 2 moves only when the pressure in housing chamber A which increases with the increase in oil pressure of the main gallery is larger than the elastic support force of main spring 7a, such that relief valve 1 does not operate when the pressure in housing chamber A is not larger than the elastic support force of main spring 7a.

However, when oil pressure Pa above the modulus of elasticity of main spring 7a is produced in the main gallery by continuous oil-sending of the oil pump, oil pressure Pa is applied to housing chamber A, such that plunger 2 moves down to plunger chamber B while compressing main spring 7a.

As plunger 2 is moved by increase in oil pressure in housing chamber A, plunger chamber B extends to bypass hole 23 across return hole 22.

In this state, the oil discharged through the outlet of the oil pump flows into plunger chamber B through return hole 22 together with the oil flow supplied to the main gallery, such that oil flow coming out through bypass hole 23 is formed.

The oil coming out through bypass hole 23 returns to the oil pump or the oil pan.

As described above, since plunger 2 moves while compressing main spring 7a when the oil pressure of the main gallery becomes higher to the oil pressure Pa above the modulus of elasticity of main spring 7a, relief valve 1 returns some of the oil coming out through the outlet of the oil pump to the oil pump or the oil pan.

The oil pump can decrease the discharging pressure of the oil coming out of the oil pump by the bypass flow.

Therefore, relief valve 1 that operates in cold start of an engine can prevent the main gallery from being damaged by appropriately decreasing the discharging pressure of the oil pump which is relatively high in the cold start, and particularly, can largely decrease peak pressure of the oil pump, by generating bypass flow associated with the increase in oil pressure of the main gallery, by using the modulus of elasticity of main spring 7a with the seat position changed by locator 8 generating the negative vacuum pressure.

Figure 5:
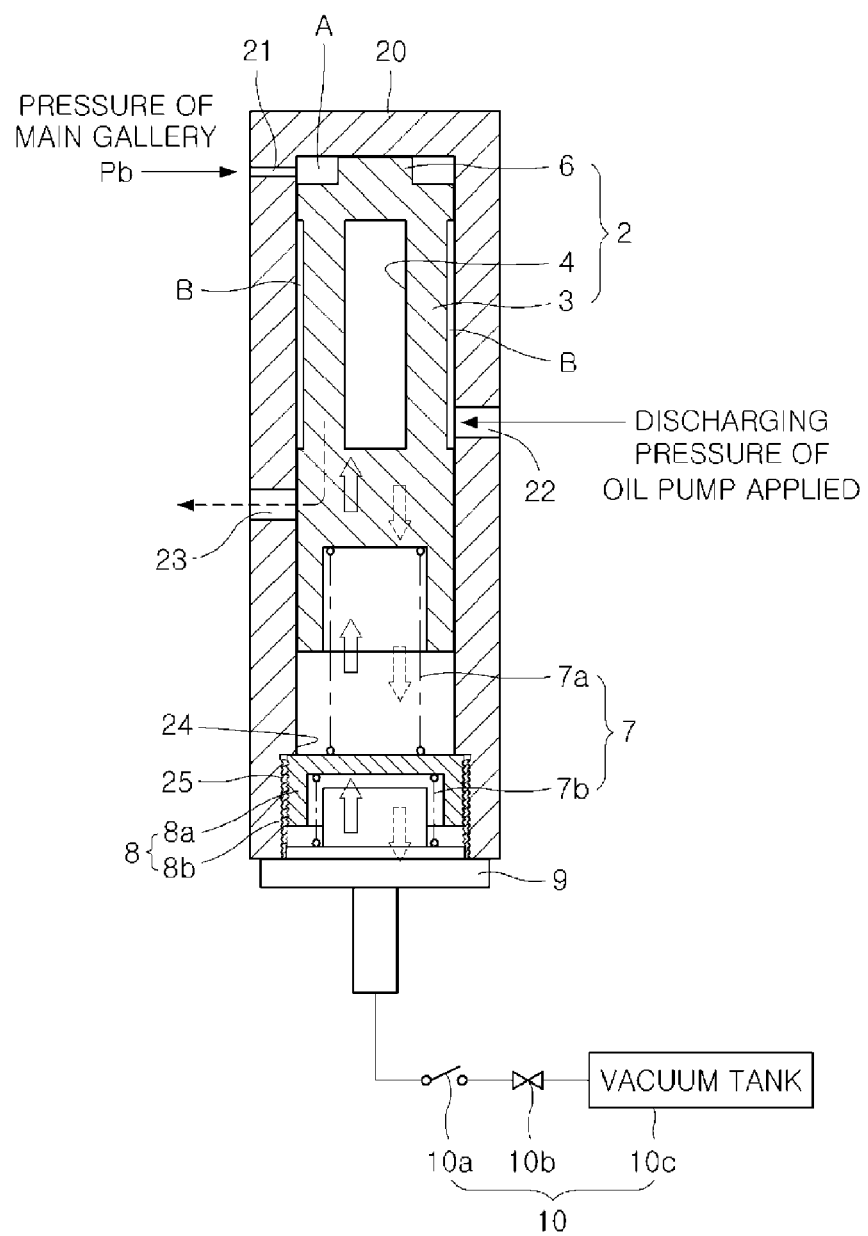

FIG. 5 shows when normal oil pressure Pb is also produced in the main gallery by warming up the engine after cold start, in which switch 10 has been turned off and negative vacuum pressure is not produced in locator 8, such that locator 8 is in an inactive state.

As switch 10a is turned off and the negative vacuum pressure pulling locator 8 is removed, stopper 8a where extension restoring force of sub spring 7b is applied is spaced from plug 9, together with tub 8b returning to the initial state, and returns to the initial state where it comes in contact with stopper cylinder 25.

Returning of locator 8 to the initial state makes the seat position higher by moving up main spring 7a supported by the top of stopper 8a, such that a spring coefficient relatively higher than when main spring 7a has moved down is achieved.

Therefore, the oil pressure in housing chamber A which compresses main spring 7a becomes higher than the oil pressure in cold start.

The solid-line arrow in FIG. 5 shows that the oil pressure in housing chamber A is not larger than the elastic force of main spring 7a elastically supporting plunger 2, such that plunger 2 does not move.

In this state, the oil is kept supplied to the main gallery from the oil pump and the supply continues until normal oil pressure Pb is produced in the main gallery.

However, as shown by a dotted-line arrow in FIG. 5, when oil pressure of the main gallery that is larger than normal oil pressure Pb is applied to housing chamber A through operational hole 21, plunger 2 where the oil pressure in housing chamber A is applied moves while compressing main spring 7a and sub-spring 7b, such that plunger chamber B extends to bypass hole 23 across return hole 22.

In this state, the oil discharged through the outlet of the oil pump flows into plunger chamber B through return hole 22 together with the oil flow supplied to the main gallery, such that oil flow coming out through bypass hole 23 is formed.

The oil coming out through bypass hole 23 returns to the oil pump or the oil pan.

As described above, since plunger 2 moves while compressing springs 7a and 7b when the oil pressure of the main gallery becomes higher than the modulus of elasticity of main spring 7a and sub-spring 7b with the seat position changed, relief valve 1 returns some of the oil coming out through the outlet of the oil pump to the oil pump or the oil pan.

The oil pump can decrease the discharging pressure of the oil coming out of the oil pump by the bypass flow.

Therefore, relief valve 1 that operates when the engine is warmed up can prevent the main gallery from being damaged by high discharging pressure of the oil pump, by generating the bypass flow against the increase in oil pressure of the main gallery which is higher than normal oil pressure Pb, by using the modulus of elasticity of main spring 7a and sub-spring 7b of which the seat positions are changed by inactivity of locator 8.

Figure 6:
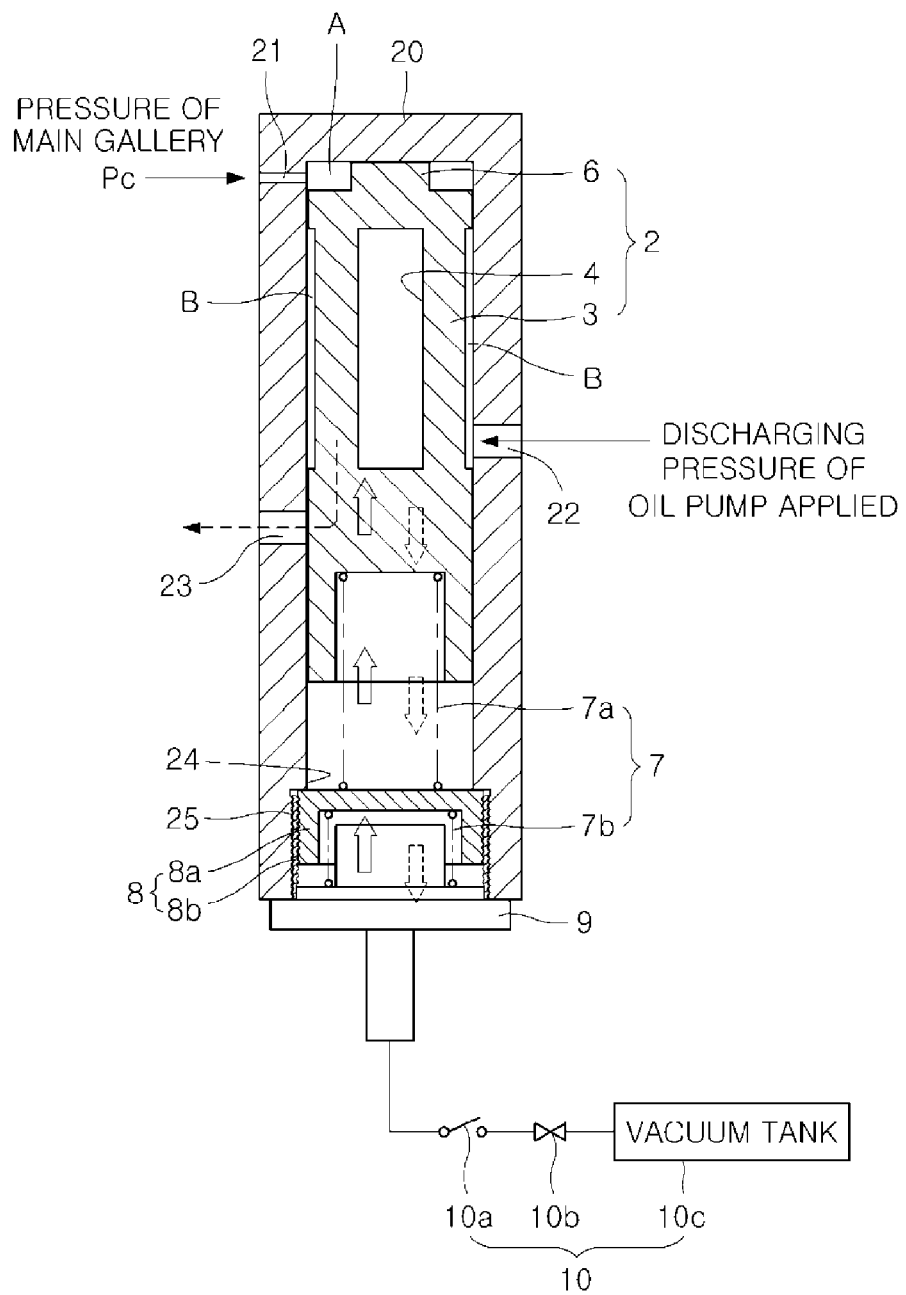
Figure 7:
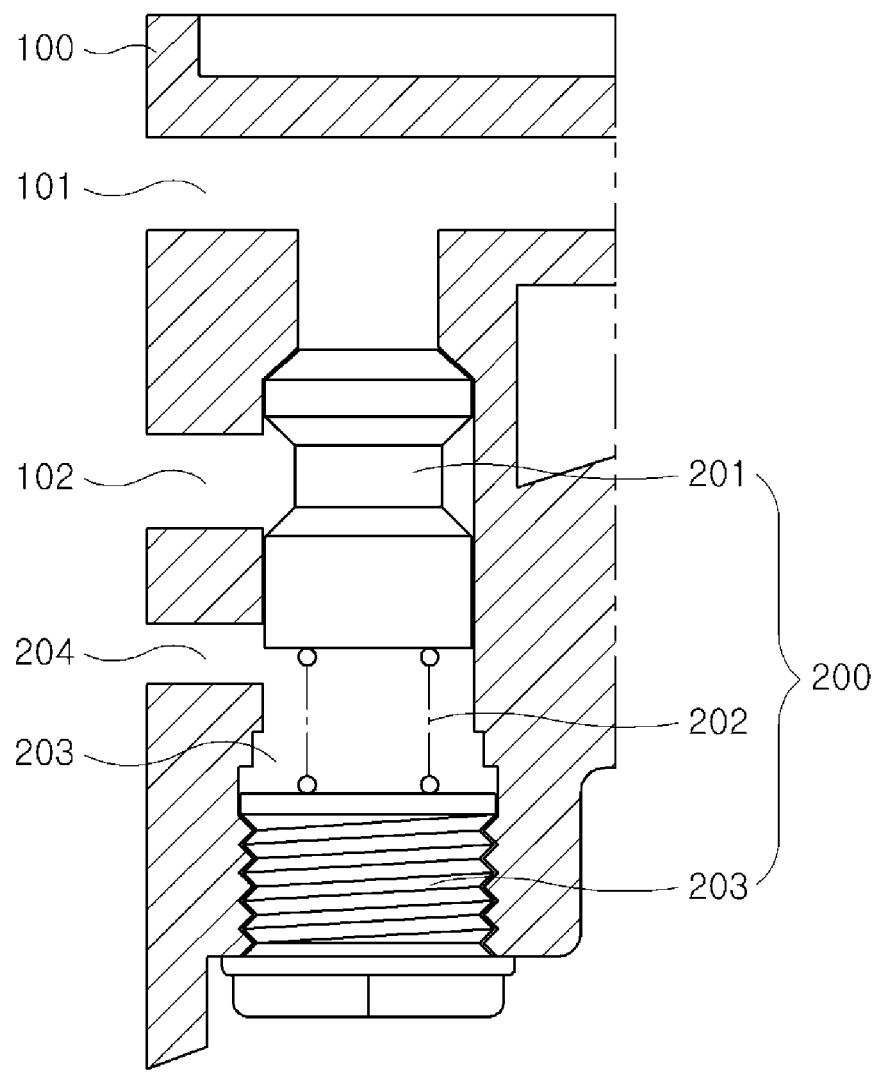
FIG. 7 is a view showing the configuration of a relief valve of the related art.
Figure 8:
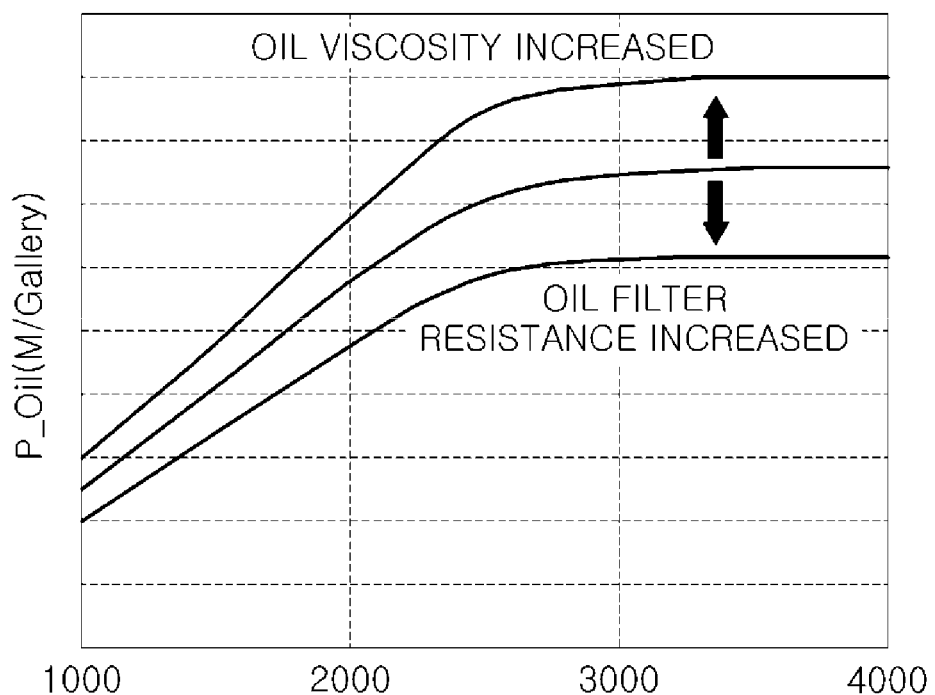
FIG. 8 is a diagram showing performance of the relief valve according to the related art shown in FIG. 7.

FIG. 6 is a view showing the operation of the relief valve according to the exemplary embodiment of the present invention when the engine has been fully warmed up.

In the state shown in the figure, as in FIG. 5 showing warm-up, as switch 10a is turned off and the negative vacuum pressure pulling locator 8 is removed, stopper 8a where extension restoring force of sub spring 7b is applied is spaced from plug 9, together with tub 8b returning to the initial state, and returns to the initial state where it comes in contact with stopper cylinder 25.

Therefore, the full warm-up state of the engine shown in FIG. 6 is different from the non-full warm-up state only in oil pressure Pc of the main gallery which is applied to housing chamber A in FIG. 5, but all the operational conditions, the operation, and the effect are implemented in the same way.

As described above, relief valve 1 according to the exemplary embodiment of the present invention can control the oil pressure of the main gallery, which changes in accordance with the operational conditions of the engine, in a stable and optimum state, by changing the modulus of elasticity by heightening/lowering the seat positions of main spring 7a and sub-spring 7b with locator 8 that is operated by the negative vacuum pressure in accordance with the oil pressure of the main gallery.

That is, it is possible to prevent the main gallery from being damaged in cold start of an engine by largely decreasing peak pressure of an oil pump, by using bypass flow generated by the oil pressure of the main gallery, and to control the discharging pressure of the oil pump at the optimum level when the engine is warmed up.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A relief valve for an oil pump comprising:
a housing defining a relief space therein;
a plunger that is slidably disposed in the relief space of the housing and divides the relief space into a housing chamber fluid-communicating with a main gallery of an engine and a plunger chamber fluid-communicating with an outlet of the oil pump discharging oil to the main gallery and selectively bypassing a portion of oil discharged from the main gallery;
an elastic member that elastically supports the plunger and is compressed by oil pressure of the main gallery supplied in the plunger chamber, wherein the oil pressure of the main gallery is relatively lower than an oil pressure under a warm-up state of the engine;
a locator that is disposed under the plunger in the housing and supports the elastic member;
a plug that is coupled to a lower portion of the housing under the relief space and supports the locator such that a modulus of elasticity in the elastic member is changed by a change in seat position of the elastic member; and
a negative pressure supplier that is fluid-connected to the plug and selectively generates negative vacuum pressure in the locator such that a height of the locator changes;
wherein the negative pressure supplier includes:
a switch that is selectively turned on/off;
a vacuum tank that generates the negative vacuum pressure in the locator through an axial hole formed through the plug; and
a valve that makes the negative vacuum pressure of the vacuum tank transmitted in one direction.

2. The relief valve for the oil pump as defined in claim 1, wherein a plunger body of the plunger defines the housing chamber above the plunger body inserted in the relief space and defines the plunger chamber using at least one or more oil channels formed through the plunger body.

3. The relief valve for the oil pump as defined in claim 2, wherein the oil channels are symmetrically formed along a circumferential direction of the plunger body.

4. The relief valve for the oil pump as defined in claim 1, wherein the elastic member is partially inserted in a spring groove formed in the plunger.

5. The relief valve for the oil pump as defined in claim 4, wherein the spring groove is formed in a lower portion of the plunger body of the plunger which is inserted in the relief space.

6. The relief valve for the oil pump as defined in claim 1, wherein the elastic member includes:
a main spring elastically supporting the plunger and the locator; and
a sub-spring disposed between the locator and the plug and elastically supporting the locator toward the main spring.

7. The relief valve for the oil pump as defined in claim 6, wherein the main spring and the sub-spring have different modulus of elasticity.

8. A relief valve for an oil pump comprising:
a housing defining a relief space therein;
a plunger that is slidably disposed in the relief space of the housing and divides the relief space into a housing chamber fluid-communicating with a main gallery of an engine and a plunger chamber fluid-communicating with an outlet of the oil pump discharging oil to the main gallery and selectively bypassing a portion of oil discharged from the main gallery;
an elastic member that elastically supports the plunger and is compressed by oil pressure of the main gallery supplied in the plunger chamber, wherein the oil pressure of the main gallery is relatively lower than an oil pressure under a warm-up state of the engine;
a locator that is disposed under the plunger in the housing and supports the elastic member;
a plug that is coupled to a lower portion of the housing under the relief space and supports the locator such that a modulus of elasticity in the elastic member is changed by a change in seat position of the elastic member; and
a negative pressure supplier that is fluid-connected to the plug and selectively generates negative vacuum pressure in the locator such that a height of the locator changes;
wherein the elastic member includes:
a main spring elastically supporting the plunger and the locator; and
a sub-spring disposed between the locator and the plug and elastically supporting the locator toward the main spring; and
wherein the locator includes:
a stopper that is disposed under the plunger body and accommodates the sub-spring of the elastic member therein, wherein the stopper defines a negative vacuum pressure space therein such that the negative pressure supplier selectively generates the negative vacuum pressure under the stopper; and
a tube engaged with the stopper and supporting the main spring of the elastic member, wherein the tube is compressed or extended by movement of the stopper such the height of the stopper changes.

9. The relief valve for the oil pump as defined in claim 8, wherein the tube encloses the stopper and receives the sub-spring therein.

10. The relief valve for the oil pump as defined in claim 9, wherein the housing includes the stopper cylinder to receive the locator and the sub-spring therein, a diameter of the stopper cylinder being larger that a diameter of the relief space so as to restrict movement of the locator within the stopper cylinder.

11. The relief valve for the oil pump as defined in claim 8, wherein a change in the height of the stopper is limited by a stopper cylinder coaxially expanding at a lower portion of the relief space.

12. The relief valve for the oil pump as defined in claim 8, wherein the tube is made of extendable rubber in a bellows shape.

* * * * *